Oct. 5, 1965    J. R. MAYER    3,210,087
RADIALLY CONTAINED PACKING HAVING RADIALLY
INNER AND OUTER SEALING RINGS
Filed Feb. 1, 1962    3 Sheets-Sheet 1

JAMES R. MAYER
INVENTOR.

BY Joseph W. Holloway
ATTORNEY

Oct. 5, 1965  J. R. MAYER  3,210,087
RADIALLY CONTAINED PACKING HAVING RADIALLY
INNER AND OUTER SEALING RINGS
Filed Feb. 1, 1962  3 Sheets-Sheet 2
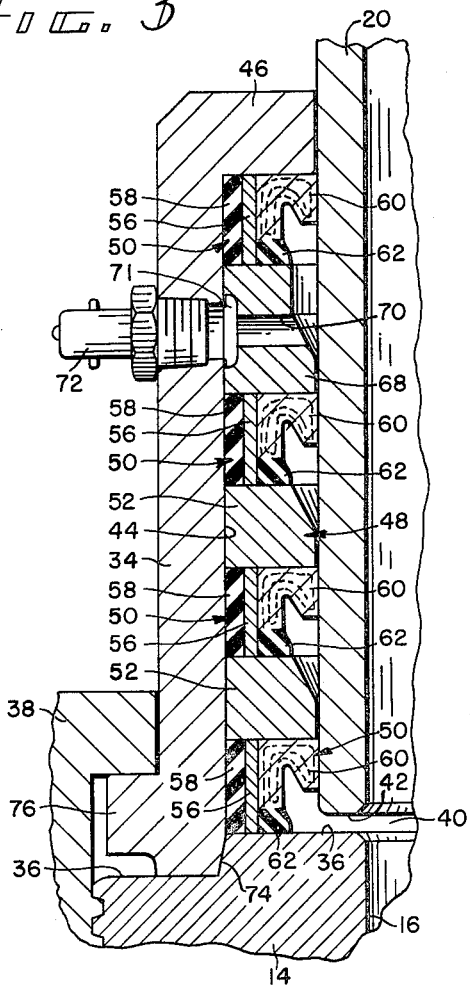
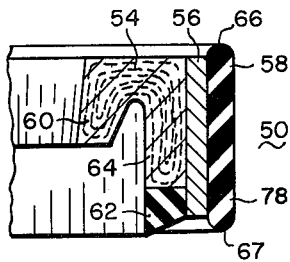
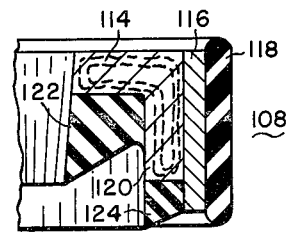
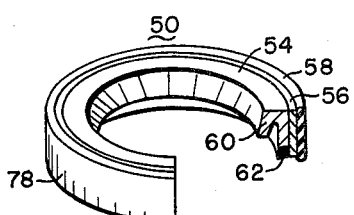
JAMES R. MAYER
INVENTOR.
BY Joseph W. Holloway
ATTORNEY

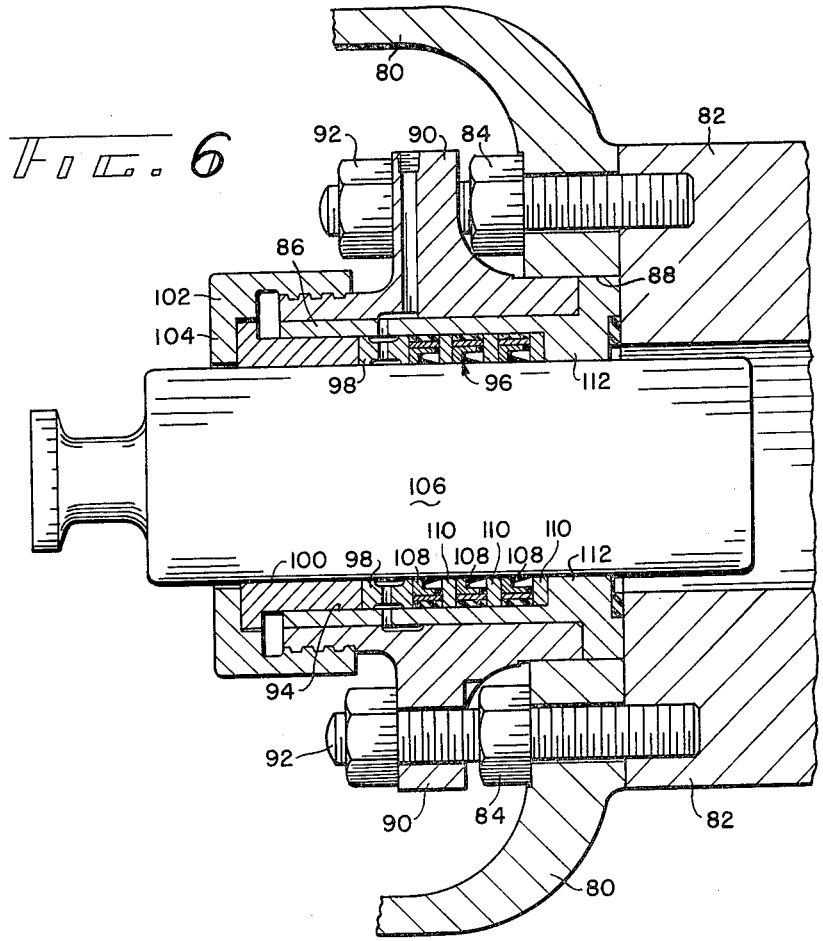
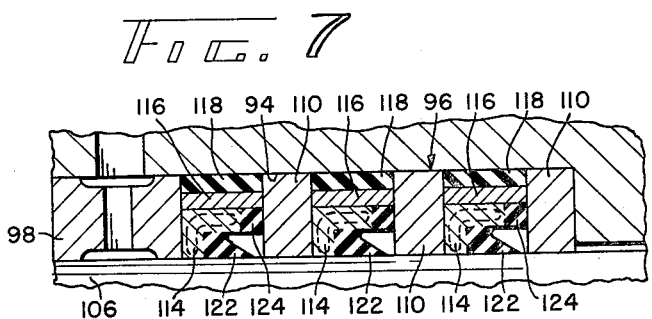

United States Patent Office 3,210,087
Patented Oct. 5, 1965

3,210,087
RADIALLY CONTAINED PACKING HAVING RADIALLY INNER AND OUTER SEALING RINGS
James R. Mayer, Dallas, Tex., assignor to Gardner-Denver Company, a corporation of Delaware
Filed Feb. 1, 1962, Ser. No. 170,419
4 Claims. (Cl. 277—125)

This invention pertains generally to hydraulic sealing means and particularly to improvements in sealing structures effective to provide fluid-tight connections between stationary and movable members of apparatus intended for handling drilling fluid and the like.

One embodiment of the aforesaid type of sealing means, to be hereinafter described, is particularly well adapted for use as a packing for a washpipe of a hydraulic rotary swivel. Another illustrative embodiment relates particularly to mud pump plunger packings. In these embodiments a replaceable packing assembly is employed to prevent escape of pressurized drilling fluid between a stationary member and a relatively rotatable or reciprocable operating member. Conventionally, a packing assembly of the type under consideration includes a number of discrete resilient sealing rings coaxially stacked one upon the other in an annular leakage passageway defined between portions of the stationary and movable members. These rings may directly abut one another or may be axially spaced by intervening rigid spacer rings. Usually, flexible lip portions of the sealing rings extend radially for fluid-tight engagement with the movable member.

When one end of a multi-ring packing assembly is subjected to fluid flow, the sealing rings are subjected to great pressure forces tending to displace the rings axially within the aforesaid fluid passageway thereby to compress the downstream rings at the opposite end of the assembly. Such compression causes undesirable squeezing or extrusion of the lip portions of the effected rings into rapidly wearing engagement with the movable member. Examinations of multi-ring packing assemblies show that failure of the fluid seal is usually caused by extreme wearing and deterioration of the rings positioned farthest downstream, while the upstream packing rings are relatively unworn. Therefore, an important aspect of this invention is the provision of an improved packing assembly wherein wear is substantially evenly sustained by each sealing ring of the assembly, thereby greatly increasing sealing ring life and the intervals between necessary replacement of the rings. This feature of the invention has the beneficial effects of reducing down time of the fluid handling apparatus and effecting substantial savings in the cost of parts and labor required to replace worn packings. For the attainment of the above-stated object, the invention contemplates the provision of a packing assembly wherein stacked resilient sealing rings are positively held and supported against axial displacement within the packing chamber, thereby eliminating undesirable distortion and excessive wear of certain rings in the assembly.

Another object is to provide a unitary packing ring comprising a resilient sealing ring having a concentrically disposed rigid supporting ring nonrotatably attached thereto by bonding, or an equivalent process. In this construction, the supporting rings are cooperable with abutting parts of the packing assembly and the stationary member to prevent fluid-pressure-induced axial squeezing and resulting excessive radial distortion of the sealing rings.

Still another important feature of this invention is the provision of a laminose packing ring having primary and secondary sealing rings for sealing potential leakage paths between the packing rings and between the packing rings and the stationary member. The secondary sealing ring is physically separated from the primary sealing ring by the aforementioned rigid seal supporting ring and is bonded or otherwise nonrotatably attached to the supporting ring. Furthermore, upon assembly of the packing assembly, the secondary sealing ring is compressed in such a manner that the resulting pressure engagement between the secondary sealing ring and the stationary member is effective to prevent relative rotary movement between the unitary packing ring and the stationary member. Thus the secondary sealing ring of the unitary packing ring performs the dual functions of sealing various leakage paths and of preventing unwanted relative movement between the packing assembly and the stationary member.

Another general object is to provide a unitary packing ring structure which is characterized by economy of manufacture, ease of installation and removal, and ease of handling.

These and other more specific objects and advantages and means for their attainment will appear from reading the following specification and claims and from considering in conjunction therewith the attached drawings to which they relate.

In the drawings:

FIG. 3 is an enlarged fragmentary view of a fluid-tight rotary connection shown in FIG. 2;

FIG. 4 is a perspective section of an improved unitary packing ring constructed in accordance with the present invention;

FIG. 5 is an enlarged sectional view of a packing ring shown in FIGS. 3 and 4;

FIG. 6 is a fragmentary sectional view of a hydraulic plunger pump embodying the present invention;

FIG. 7 is an enlarged fragmentary view of a plunger packing assembly shown in FIG. 6; and, FIG. 8 is an enlarged sectional view of a plunger packing ring embodying the present invention.

Figure 1:
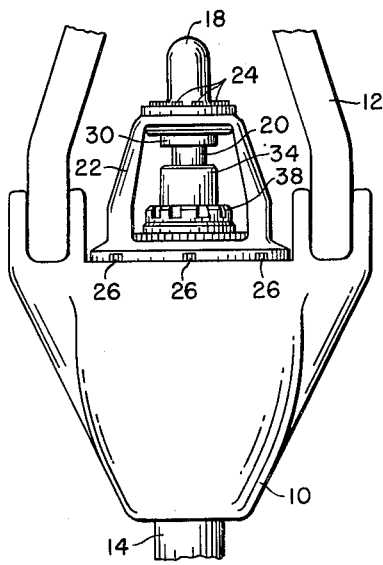
FIG. 1 is a side elevation of a hydraulic rotary swivel construction embodying the present invention.
Figure 2:
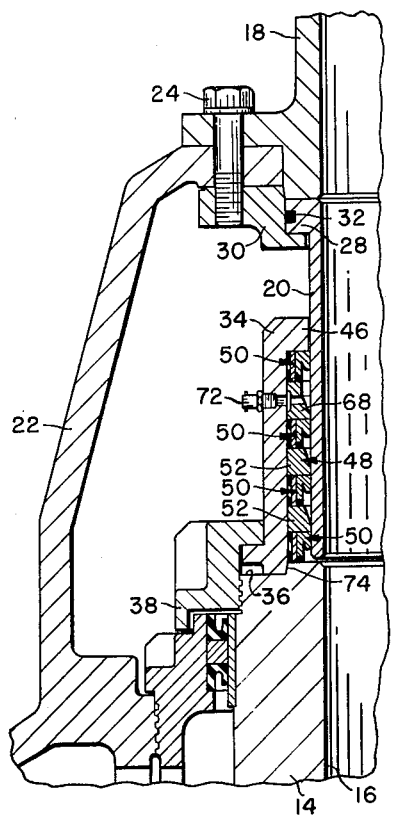
FIG. 2 is an enlarged fragmentary sectional view of the upper portion of the hydraulic swivel shown in FIG. 1.

The hydraulic rotary swivel illustrated in FIGS. 1, 2 and 3 of the drawings includes a body 10 supported by a bail 12 and a rotary stem 14 which depends from the interior of the body and is rotatably supported therein by suitable bearing means, not shown. As shown in FIG. 2, the rotary stem 14 is provided with an axial passage 16 for conducting drilling fluid to a string of drill pipe connected at its lower end. The drilling fluid is supplied to the stem 14 through a gooseneck 18 and a tubular washpipe 20. The gooseneck is nonrotatably secured to the upper end of a supporting bonnet 22 by a plurality of angularly spaced fasteners 24; and, the bonnet is, in turn, secured to the swivel body 10 by means of fasteners 26. The flanged upper end 28 of the washpipe is nonrotatably secured to the bonnet by any suitable means, such as a clamping plate 30; and, a resilient sealing body 32 is disposed between the washpipe and the clamping plate. A generally tubular packing box 34 is nonrotatably secured to the stepped upper end surface 36 of stem 14 by a threaded clamping nut 38. The packing box is coaxially arranged about a substantial longitudinal portion of the washpipe 20; and, from the aforedescribed part relationships, it will be understood that relative rotation will occur between the stationary washpipe and the packing box when the stem and packing box are rotatably driven.

FIG. 3 shows that the aforementioned washpipe 20 is axially spaced from the stem 14 by an annular space 40 defined by the stepped upper end surface 36 of the stem and the extreme lower end surface 42 of the washpipe. Furthermore, the packing box 34 is provided with an annular recess or packing chamber 44 which opens radially toward washpipe 20 and downwardly into communication with the space 40. To prevent fluid from passing through space 40 and then upwardly along the outside of the washpipe and between the inwardly extending annular packing box flange 46 and the washpipe, a plural-part fluid packing assembly, indicated in its entirety by numeral 48, is supported and retained in chamber 44 between spaced abutments defined by flange 46 and surface 36 of the stem.

In the embodiment of the invention shown in FIGS. 2 and 3, the packing assembly 48 comprises a plurality of packing rings, each designated in its entirety by numeral 50, and a plurality of spacer rings 52; the packing rings and spacer rings being alternately stacked one upon the other in surrounding relationship to the washpipe 20. Preferably, the packing rings and spacer rings rotate with the packing box 34 whereby the packing rings provide a dynamic or rotary hydraulic seal about the stationary washpipe 20.

The novel packing ring 50, shown in an enlarged sectional view at FIG. 5, comprises a unitary, laminose structure made up of three discrete, generally concentrically disposed rings or annular laminae comprising an inner ring 54, an intermediate ring 56, and an outer ring 58. The inner ring 54 comprises a so-called "lip packing" having a lip portion 60 made from a suitably flexible and resilient material, such as cord-reinforced rubber or buna. The lower foot portion 62 of the upstanding leg 64 of the inner ring is preferably made without internal reinforcement for a purpose to be described. The intermediate ring 56 is made of a substantially noncompressible material, such as steel for example, and is dimensioned to fit closely about the inner ring 54. The outer ring 58 preferably comprises a readily deformable elastic material such as rubber or buna. The outer ring is dimensioned to fit closely about the intermediate ring 56 and is provided with upper and lower portions 66 and 67, respectively, which extend axially beyond the intermediate ring for a purpose to be described. In the preferred form of the invention, the innner ring 54 and the outer ring 58 are fixedly joined to the intermediate ring 56 by bonding, vulcanizing or an equivalent process employed for the same purpose. This produces a unitary or laminated packing ring 50, shown in FIG. 4, which can be fabricated in a single operation.

The spacer rings 52 are conventional in form and are employed to space the packings rings 50 and to define abutments for the packing rings in the usual manner. Preferably, the spacer rings are made from a rigid, substantially noncompressible material, such as steel or brass. If desired, one or more of the spacer rings may be constructed in accordance with spacer ring 68 which has one or more radial apertures 70 communicating through an annular passage 71 with one or more grease fittings 72 threadably secured in the wall of packing box 34. The construction of grease fitting 72 and the desirability of introducing grease into a swivel packing are well understood and need not be further discussed.

The illustrative packing assembly 48 is assembled by alternately inserting the packing rings 50 and the spacer rings 52 into the packing box chamber 44 with the uppermost packing ring abutting flange 46 of the packing box 34, as shown in FIG. 3. The packing box is then assembled with the rotary stem 14 by means of the clamping nut 38. The packing box and the stem are provided with complementary engaging tapers, indicated at numeral 74, which serve to coaxially align and seal these members as the clamping nut 38 is tightened down against an annular flange 76 extending radially outwardly from the packing box. Preferably, the clamping nut 38 is tightened down until the extreme lower end surface of the packing box abuts the stepped upper end surface 36 of the stem 14, as shown in FIG. 3. When the packing box is fully assembled by drawing it down in this manner, the packing rings 50 and the spacer rings 52 are forcibly and rigidly clamped in abutting relationship between the packing box flange 46 and the upper stem surface 36.

The aforedescribed rigid stacking of the packing rings and the spacer rings is an important feature of this invention and provides several advantages over known packing assemblies of the same or similar types. First of all, upon assembly, the initial compression of the resilient inner and outer rings, 54 and 58 respectively, is regulated by the rigid supporting action of the intermediate ring 56. By properly controlling the overall axial dimension of the stacked rigid elements of the packing assembly 48, i.e., the intermediate rings 56 and the spacer rings 52, and the length of the packing chamber defined by the packing box recess 44, the initial compressive force applied to the resilient elements of the assembly can be closely controlled even in the field where unskilled or careless workmen perform the assembly operation. Perhaps an even more important advantage derivable from the employment of the rigid intermediate ring 56 is that the inner sealing rings 54 are restrained against upward axial displacement within chamber 44 due to fluid pressure forces operating upon the lip portions 60. This tendency of the packing rings to move or compress upwardly is readily understandable when it is recognized that in rotary swivels the drilling fluid attempting to flow through the passageway defined by space 40 and recess 44 may be at a pressure of 5000 pounds per square inch or more. Without the support of rigid rings 56, the resilient inner rings 54 would be compressed upwardly within the packing box 34 by the tremendous hydraulic pressures acting thereupon. As the pressure fluid contacts successive packing rings, each ring acts as an additional piston element tending to displace the adjacent downstream packing ring with increased compressive force. The resulting gradient of pressures applied to the packing ring assembly causes excessive wearing and rapid deterioration of the annular lip portions 60 of the downstream rings due to the tendency of the lip portions to squeeze or extrude radially into high pressure contact with the washpipe 20. Moreover, while the lip portions of the upstream rings remain substantially unworn, the lip portions of the downstream rings wear and otherwise deteriorate very rapidly, thereby necessitating removal of the entire swivel apparatus from service in order to replace worn rings. Such undesirable effects are avoided by employing packing rings constructed in accordance with the present invention whereby the axial dimension of the space in which the inner ring 54 is confined is rigidly maintained by the intermediate ring 56. Thus, in the disclosed construction, the hydraulic force acting to squeeze a given lip portion 60 into wearing contact with the washpipe 20 can not exceed that force generated by the pressurized drilling fluid acting upon the pressure surface defined by that lip portion alone.

Another feature of this invention is the provision of a packing ring having improved means for statically sealing the fluid leakage paths extending between the packing rings and the spacer rings and between the packing rings and the packing box. This aspect of the invention is accomplished in a novel and improved manner by the aforementioned foot portion 62 of the inner ring 54 and by the outer sealing ring or lamina 58. As the clamping nut 38 is drawn down to produce the aforedescribed rigidly stacked condition between the spacer rings 52 and the intermediate rings 56, the resilient foot portion 62, shown in its relaxed state in FIG. 5, deformably engages an abutting surface, as seen in FIG. 3, to provide a fluid-tight, static seal against the flow of drilling fluid past the bottom surface of the inner ring 54. Similarly, the upper and lower extending portions 66 and 67 of the outer ring 58 are compressed into deforming engagement with axially abutting surfaces. Should the seal provided by the foot portion 62 of the inner ring fail, the lower extending portion 67 of the outer ring 58 provides a static back-up or secondary seal against the entrance of fluid between the packing ring 50 and the packing box 34. The upper extending portion 66 of the outer ring 58 is also compressed into fluid-tight sealing engagement with an abutting surface and provides a secondary seal in case of failure of the seal at the top of the packing ring afforded by the lip portion 60 of the inner ring. Moreover, upon assembly of the packing assembly, the elastic material of the extending portions 66 and 67 of the outer ring are displaced in such a manner that the outer cylindrical wall 78 of this ring is pressed into intimate sealing contact with the cylindrical wall of packing chamber 44, thereby providing an elongated surface seal between the packing ring and the packing box. Thus it will be appreciated that the aforedescribed laminated packing ring, having inner and outer sealing rings, provides abundant sealing means for the various fluid leakage paths and provides discrete secondary seals should the primary seals fail due to wear or improper assembly.

Besides the sealing function just described, the outer sealing ring 58 functions to prevent undesirable rotation of the packing rings 50 and spacer rings 52 with respect to the packing box 34. Compression of the outer ring, upon assembly of the packing assembly 48, causes the resilient material of the ring to contact the wall of the chamber 44 and the abutting surfaces of the spacer rings 52 with sufficient pressure to provide a nonslip engagement therebetween. This frictional engagement is effective to hold the packing rings and spacer rings against rotation should the axial clamping force applied to the packing assembly be insufficient for this purpose due to a decrease in the overall axial dimension of the packing assembly caused by wear or due to improper tightening of the clamping nut 38.

Still another advantage afforded by a unitary packing ring structure having an elastically deformable outer ring 58 is that the outer diameter of the packing ring 50 may be made substantially less than the inner diameter of the packing chamber 44. Thus the packing rings can be quickly and easily assembled in the packing box and can be disassembled in a like manner. Furthermore, since the resilient outer ring is compressible into mating conformity with the wall of chamber 44, the radial dimensions and surface conditions of the chamber 44 and the outer ring need not be closely controlled.

Another illustrative embodiment of the present invention is shown in FIGS. 6, 7 and 8 which depict a unitary packing ring, similar to packing ring 50, employed as a plunger packing in a pump of the type commonly employed to pump drilling fluid at high pressures. Pumps of the aforesaid type of pump usually include a frame member 80 to which a valved fluid receptacle 82 is rigidly secured by radially spaced fasteners 84. A cylinder liner 86 has its forward end disposed within an opening 88 in frame 80 in sealed engagement with the end of receptacle 82. A stuffing box 90 encircles the liner 86 and is secured to frame 80 by radially spaced fasteners 92 to clamp the liner in end to end abutting relationship with the receptacle 82. The liner 86 is provided with an annular recess or chamber 94 which houses a packing assembly, indicated in its entirety by numeral 96, a lantern ring 98 and an annular gland bushing 100. A threaded gland nut 102 threadably engages the stuffing box 90 and is employed to clamp the packing assembly 96, the lantern ring 98 and the gland bushing 100 between the forward end wall of chamber 94 and a flange portion 104 of the gland nut. A piston or plunger 106 is coaxially disposed within liner 86 and is slidably driven therein by any suitable reciprocating power source, not shown, to produce a fluid pumping action within the valved fluid receptacle 82. The mode of operation of this type of reciprocating pump is well understood and need not be further described.

As will be seen in FIG. 7, the plunger packing assembly 96 surrounding plunger 106 is structurally and operationally similar to the swivel packing assembly 48 shown in FIG. 3 and described above in detail. Structurally, the plunger packing assembly comprises alternately stacked packing rings 108 and spacer rings 110. The packing rings and spacer rings are clampingly retained between the lantern ring 98 and an inwardly extending annular shoulder 112 at the forward end of the liner 86. It will be understood that the function of packing assembly 96 is to prevent the flow of fluid from the interior of receptacle 82 along the plunger 106 during the forward or pumping stroke of the plunger.

As may be seen by a comparison of FIGS. 5 and 8, a preferred form of plunger packing ring 108 is constructed substantially in accordance with the aforedescribed swivel packing rings 50. Thus the illustrative plunger packing ring 108 comprises an inner lip-type sealing ring 114, a rigid intermediate ring 116 and an outer resilient sealing ring 118. The rings 114, 116 and 118 are concentrically arranged and are joined together by bonding or the like to form a unitary, laminose structure. The inner ring 114 is made of rubber, buna or the like, and in its preferred form includes a cord-reinforced leg portion 120 and lip and foot portions, 122 and 124, respectively, which have no internal reinforcement. The modified structure and composition of the lip portion 122 are particularly well suited to provide a dynamic fluid seal with a relatively reciprocable member such as plunger 106. In the plunger packing ring 108, the structure, material and function of the foot portion 124, the intermediate ring 116 and the outer ring 118 are the same as that of the corresponding parts of the hereinbefore described swivel packing ring 50. Thus the foot portion 124 and the outer ring 118 provide seals for the various fluid leakage paths between the packing rings 108 and the spacer rings 110 and between the packing rings and the wall of the chamber 94. The intermediate rings 116 are clamped between the rigid spacer rings 110 by the clamping action of the gland nut 104 and cooperably function to limit the axial compression and undesirable radial extrusion of the inner ring 114 upon assembly of the packing assembly and during the pumping operation of plunger 106.

It will be appreciated that the invention is not limited to the embodiments or the applications described above. For example, the swivel packing rings 50 could be mounted upon the washpipe 20 and the plunger packing rings 108 could be carried by the plunger 106. Although it is preferable to join the component rings of the unitary packing ring by a bonding or vulcanizing operation, an acceptable product may be made by cementing the component rings together or by providing interlocking surface means between the component rings. While the embodiments of the invention disclosed herein in detail are particularly well suited for use as sealing means for drilling fluid swivels and pumps, it will be apparent that the packing rings constructed in accordance with the appended claims may be employed in a wide range of fluid sealing applications. Moreover, it will be understood that the above description and accompanying drawings comprehend only general and preferred embodiments of the invention and that various changes in construction, proportion, material and arrangement of the elements thereof may be made without sacrificing any of the above-enumerated advantages or departing from the scope of the appended claims.

What is claimed as new and useful is:

1. A unitary packing ring comprising generally concentric rings including resilient inner and outer sealing rings and a non-compressible intermediate ring, said inner and outer rings being disconnected from one another and fixedly and sealably attached to the opposite side walls of said intermediate ring, the latter having opposite end surfaces separating adjacent end surfaces of said inner and outer rings, and said inner ring including a radially extending sealing lip and an elastically deformable foot portion, the latter extending axially beyond one of said opposite end surfaces.

2. The invention defined in claim 1 wherein: said outer ring includes elastically deformable sealing portions extending axially beyond said opposite end surfaces.

3. A unitary packing ring comprising generally concentric rings including resilient inner and outer sealing rings and a substantially rigid intermediate ring, said inner and outer rings being fixedly and sealably attached to the opposite side walls of said intermediate ring, the latter having opposite end surfaces separating adjacent end surfaces of said inner and outer rings, and said inner ring including a radially extending sealing lip and an elastically deformable sealing foot, the latter extending axially beyond one of said opposite end surfaces.

4. The invention defined in claim 3 wherein: said outer ring includes elastically deformable sealing portions extending axially beyond at least one of said opposite end surfaces.

References Cited by the Examiner

UNITED STATES PATENTS

| | | | |
|---|---|---|---|
| 707,930 | 8/02 | Kirschning | 277—235 X |
| 1,363,565 | 12/20 | Christenson | 277—227 X |
| 1,617,952 | 2/27 | Judd | 277—123 X |
| 1,665,208 | 4/28 | Huff | 277—235 |
| 1,712,003 | 5/29 | Hubbard | 277—227 X |
| 2,143,106 | 1/39 | Freedlander | 277—235 |
| 2,386,898 | 10/45 | Karassik | 277—64 X |
| 2,454,567 | 11/48 | Pierson | 277—235 |
| 2,678,609 | 5/54 | Ashton | 277—205 X |
| 2,686,092 | 8/54 | Neesen | 277—232 X |
| 2,721,748 | 10/55 | Tremolada | 277—123 X |
| 2,797,944 | 7/57 | Riesing | 277—235 X |
| 2,824,703 | 2/58 | Van Hook | 277—235 X |
| 2,837,359 | 6/58 | Corsi | 277—235 X |
| 2,864,631 | 12/58 | Kemp | 277—72 X |
| 2,977,143 | 3/61 | Talmonti | 277—227 |
| 3,003,835 | 10/61 | Schindel | 277—235 X |
| 3,027,167 | 3/62 | Liebig | 277—235 X |

FOREIGN PATENTS 478,136   1/38   Great Britain.

LEWIS J. LENNY, *Primary Examiner.*

WALTER A. SCHEEL, EDWARD V. BENHAM, *Examiners.*